(12) United States Patent
Ionescu

(10) Patent No.: US 7,558,267 B2
(45) Date of Patent: Jul. 7, 2009

(54) METHOD AND SYSTEM FOR PLACING RESTRICTIONS ON SESSIONS

(75) Inventor: Radu V. Ionescu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 490 days.

(21) Appl. No.: 11/055,883

(22) Filed: Feb. 11, 2005

(65) Prior Publication Data

US 2006/0182084 A1 Aug. 17, 2006

(51) Int. Cl.
*H04L 12/28* (2006.01)
*H04L 12/66* (2006.01)
*G06F 15/16* (2006.01)

(52) U.S. Cl. .................... 370/395.2; 370/352; 709/207; 709/227

(58) Field of Classification Search .................. None
See application file for complete search history.

(56) References Cited

U.S. PATENT DOCUMENTS

| | | | |
|---|---|---|---|
| 6,212,548 B1* | 4/2001 | DeSimone et al. | 709/204 |
| 6,496,851 B1* | 12/2002 | Morris et al. | 709/204 |
| 6,697,840 B1* | 2/2004 | Godefroid et al. | 709/205 |
| 6,879,994 B1* | 4/2005 | Matsliach et al. | 709/204 |
| 6,931,114 B1* | 8/2005 | Martin | 379/203.01 |
| 7,240,093 B1* | 7/2007 | Danieli et al. | 709/205 |
| 2002/0095465 A1* | 7/2002 | Banks et al. | 709/206 |
| 2002/0163538 A1* | 11/2002 | Shteyn | 345/752 |
| 2003/0023508 A1* | 1/2003 | Deep | 705/26 |
| 2004/0024879 A1* | 2/2004 | Dingman et al. | 709/227 |
| 2004/0073643 A1* | 4/2004 | Hayes et al. | 709/223 |
| 2004/0187109 A1* | 9/2004 | Ross et al. | 718/100 |
| 2004/0202303 A1* | 10/2004 | Costa-Requena et al. | 379/205.01 |
| 2004/0215787 A1* | 10/2004 | Gibson et al. | 709/227 |
| 2004/0260781 A1* | 12/2004 | Shostack et al. | 709/207 |
| 2004/0260819 A1* | 12/2004 | Trossen | 709/229 |
| 2005/0047389 A1* | 3/2005 | Bond et al. | 370/351 |
| 2005/0060368 A1* | 3/2005 | Wang et al. | 709/204 |
| 2005/0114514 A1* | 5/2005 | Bostrom et al. | 709/227 |
| 2005/0132412 A1* | 6/2005 | Richardson et al. | 725/100 |
| 2005/0213580 A1* | 9/2005 | Mayer et al. | 370/395.2 |
| 2005/0249196 A1* | 11/2005 | Ansari et al. | 370/352 |
| 2006/0026288 A1* | 2/2006 | Acharya et al. | 709/227 |
| 2006/0072523 A1* | 4/2006 | Richardson et al. | 370/338 |
| 2006/0075039 A1* | 4/2006 | Narayanaswami et al. | 709/206 |
| 2006/0092895 A1* | 5/2006 | Kim et al. | 370/338 |

(Continued)

OTHER PUBLICATIONS

Rosenberg, J. et al, "SIP: Session Initiation Protocol," Request for Comments: 3261, Network Working Group, Standards Track, Jun. 2002, The Internet Society 2002, pp. 1-269.

(Continued)

*Primary Examiner*—Wing F Chan
*Assistant Examiner*—Hicham B Foud
(74) *Attorney, Agent, or Firm*—Perkins Coie LLP

(57) ABSTRACT

A method and system for initiating a communications session with a restriction is provided. A communications system allows a user to place a restriction on a session to be conducted with another user. If the other user does not agree to the restriction or if the other user's system does not support the restriction, then the session will not be conducted. The communications system may also enforce the restrictions on the session.

14 Claims, 9 Drawing Sheets

U.S. PATENT DOCUMENTS

| | | | |
|---|---|---|---|
| 2006/0239253 A1* | 10/2006 | Gallant et al. | 370/352 |
| 2006/0276193 A1* | 12/2006 | Itzkovitz et al. | 455/445 |
| 2007/0037599 A1* | 2/2007 | Tillet et al. | 455/521 |
| 2007/0217394 A1* | 9/2007 | Greene et al. | 370/352 |
| 2007/0254605 A1* | 11/2007 | Zhao et al. | 455/90.2 |
| 2008/0170680 A1* | 7/2008 | Gibson | 379/211.02 |

OTHER PUBLICATIONS

Koskelainen, P. et al., "Requirements for Floor Control," Internet Draft, Oct. 31, 2002, Internet Engineering Task Force, The Internet Society 2002, pp. 1-11.

Campbell, B. et al., "Session Initiation Protocol (SIP) Extension for Instant Messaging," Request for Comments: 3428, Network Working Group, Standards Track, Dec. 2002, The Internet Society 2002, pp. 1-19.

Handley, M. and V. Jacobson, "SDP: Session Description Protocol," Request for Comments: 2327, Network Working Group, Standards Track, Apr. 1998, The Internet Society 2002, pp. 1-43.

Schulzrinne / Rosenberg, "SIP Caller Preferences and Callee Capabilities," Internet Draft, Nov. 24, 2000, Internet Engineering Task Force, pp. 1-28.

Koskelainen, Petri. "Requirements for Conference Policy Data," Internet Draft, Feb. 24, 2003, Internet Engineering Task Force, The Internet Society 2003, pp. 1-10.

Koskelainen / Schulzrinne. "Group Messaging in SIP," Jul. 13, 2001, Internet Draft, Internet Engineering Task Force, 10 pages.

European Search Report for European Patent Application No. 06100164.0, Microsoft Corporation, Feb. 13, 2006.

European Patent Office Communication pursuant to Article 96(2) EPC, Application No. 06100164.0-1244, Applicant: Microsoft Corporation, Mar. 28, 2007.

European Patent Office Communication pursuant to Article 94(3) EPC, Application No. 06100164.0-1244, Applicant: Microsoft Corporation, Mar. 27, 2008.

* cited by examiner

```
                                    300
                                     ✕

Invitation Accepted bob@biloxi.com has accepted
           your invitation
```

METHOD AND SYSTEM FOR PLACING RESTRICTIONS ON SESSIONS

TECHNICAL FIELD

The described technology relates generally to data communication networks and particularly to communication sessions.

BACKGROUND

Applications sometimes need to establish and manage a session between computing devices. A session is a set of interactions between computing devices that occurs over a period of time. As an example, real-time communications applications such as MICROSOFT MESSENGER or Voice over Internet Protocol ("VoIP") establish sessions between communicating devices on behalf of users. These applications may use various mechanisms to establish sessions, such as a "Session Initiation Protocol" ("SIP"). SIP is an application-layer control protocol that devices can use to discover one another and to establish, modify, and terminate sessions between devices. SIP is an Internet proposed standard. Its specification, "RFC 3261," is available at the URL formed by concatenating "http://," "www," ".ietf," ".org," "/rfc," and "/rfc3261.txt." A specification for extensions to SIP relating to event notifications, "REC 3265," is available at the URL formed by concatenating "http://," "www," ".ietf," ".org," "/rfc," and "/rfc3265.txt." A specification for locating SIP servers, "RFC 3263," is available at the URL formed by concatenating "http://," "www," ".ietf," ".org," "/rfc," and "/rfc32613txt." A specification for descriptions of sessions, "RFC 2327," is available at the URL formed by concatenating "http://," "www," ".ietf," ".org," "/rfc," and "/rfc2327.txt." All these specifications are incorporated herein in their entirety by reference.

Applications may use SIP with another protocol to send or receive information. As an example, an application may use SIP with Real-time Transport Protocol ("RTP") for transporting real-time data during a session. By using SIP with other protocols, applications can create and manage a session and exchange information during the session. The protocol used with SIP to exchange information may segment the information into messages. As an example, a VoIP application may segment a long narration into shorter messages. Exchanging messages during a session is referred to as a "dialog." SIP may use lower-level communications layers to transport a dialog's messages, such as Transmission Control Protocol/Internet Protocol ("TCP/IP"), which are commonly employed transport- and network-layer protocols.

A SIP network comprises entities that can participate in a dialog as a client, server, or both. SIP supports four types of entities: user agent, proxy server, redirect server, and registrar. User agents initiate and terminate sessions by exchanging messages with other SIP entities. A user agent can be a user agent client, which is generally a device that initiates SIP requests (e.g., to initiate a session), or a user agent server, which is a device that generally receives SIP requests and responds to such requests. As examples, "IP-telephones," personal digital assistants, and any other type of computing device may be user agents. A device can be a user agent client in one dialog and a user agent server in another, or may change roles during the dialog. A proxy server is an entity that acts as a server to clients and a client to servers. In so doing, proxy servers intercept, interpret, or forward messages between clients and servers. Proxy servers contribute to network security by, e.g., validating senders and recipients of messages. A redirect server accepts a SIP request and generates a SIP response directing the client that sent the request to contact an alternate network resource. As an example, a redirect server may indicate at which of several devices a particular user is presently available. A registrar is a server that accepts registration information from SIP clients and informs a location service or other entities of the received registration information.

SIP supports two message types: requests, which are sent from a client to a server, and responses, which are sent from a server to a client, generally when responding to a request. A SIP message comprises three parts. The first part of a SIP message is a "start line," which includes fields indicating a message type and a protocol version. The second part of a SIP message comprises header fields whose values are represented as name-value pairs. The third part of a SIP message is the message's body, which is used to describe the session to be initiated or contain data relating to the session. Message bodies may appear in requests or responses.

SIP messages are routed based on the contents of their header fields. To be valid, a SIP request should contain at least the following five header fields: To, From, Contact, Max-Forwards, and Via. The To header field indicates the logical identity of the recipient of the request. The From header field indicates the logical identity of the initiator of the request. The Contact header field indicates the identity of where the sender wants to receive subsequent messages of the dialog. The Max-Forwards header field indicates the number of hops a request can make before arriving at its destination. As an example, if a message from device A transits device B before arriving at destination device C, the message is said to have made two hops (e.g., devices B and C). The Via header field indicates the path taken by the request so far (e.g., a sequence of network addresses of devices through which the request has transited) and indicates the path that should be followed when routing the response. A header may also contain Record-Route fields that are used to indicate that future requests and responses should be routed through an indicated device. Network devices may insert Record-Route header fields specifying devices when forwarding a SIP message in an attempt to force subsequent messages in a dialog to be routed through the specified devices. The Record-Route header field may contain an identifier (e.g., network address) for the device and parameters. These and other header fields are described in the SIP specifications referenced above.

SIP has a notion of a dialog or session that represents a relationship between two peers that persists for some time and facilitates sequencing and routing of messages between them. To maintain a proper SIP dialog, peers need to store a SIP routing path between themselves that may include one hop but can be much larger when multiple SIP proxies (e.g., routers) separate peers.

A SIP session can be described using the Session Description Protocol ("SDP"), RFC 2327. SDP can be used to describe multimedia sessions for the purposes of session announcement, session invitation, and other forms of session initiation. SDP data describe the session name and purpose, the time the session is active, the media of the session, and the information to receive the media (e.g., addresses and ports). SDP is extensible in that new attribute-value pairs can be defined to describe custom information about a session.

A difficulty with typical real-time sessions such as instant messaging is that very few if any restrictions can be placed on who participates in a session or what can be done with the messages of the session. For example, if user A invites user B to participate in a session and user B agrees, then user B is free to invite other users to participate in the session, such as user C. User A, however, may not want user C to participate. As another example, user A may want to keep the session with user B private in the sense that no other users will be able to see the messages of that session. Even though user B may be unable to invite user C to participate in the session, user B can still effectively forward messages to user C by using a traditional copy and paste to copy the content of the message and paste it into a message of another session with user C or into an electronic mail message that is sent to user C. It would be desirable to have a technique that would allow users to place restrictions on sessions so that unwanted users cannot participate in those sessions or see the content of the messages of those sessions.

SUMMARY

A method and system for initiating a communications session with a restriction is provided. A communications system allows a user to place a restriction on a session to be conducted with another user. If the other user does not agree to the restriction or if the other user's system does not support the restriction, then the session will not be conducted. A session is initiated by an "inviter" specifying that a session with a restriction is to be conducted with an "invitee." The communications system then sends an invitation specifying the restriction to the invitee. If the invitee agrees to abide by the restriction on the session, then the invitee sends a response to the inviter. When the inviter receives an indication that the invitee will abide by the restriction on the session, then the inviter and invitee can conduct the session, such as an instant messaging session. A client component of the communications system executing on the invitee's computer system may help enforce the restriction on the session.

DETAILED DESCRIPTION

Figure 1:
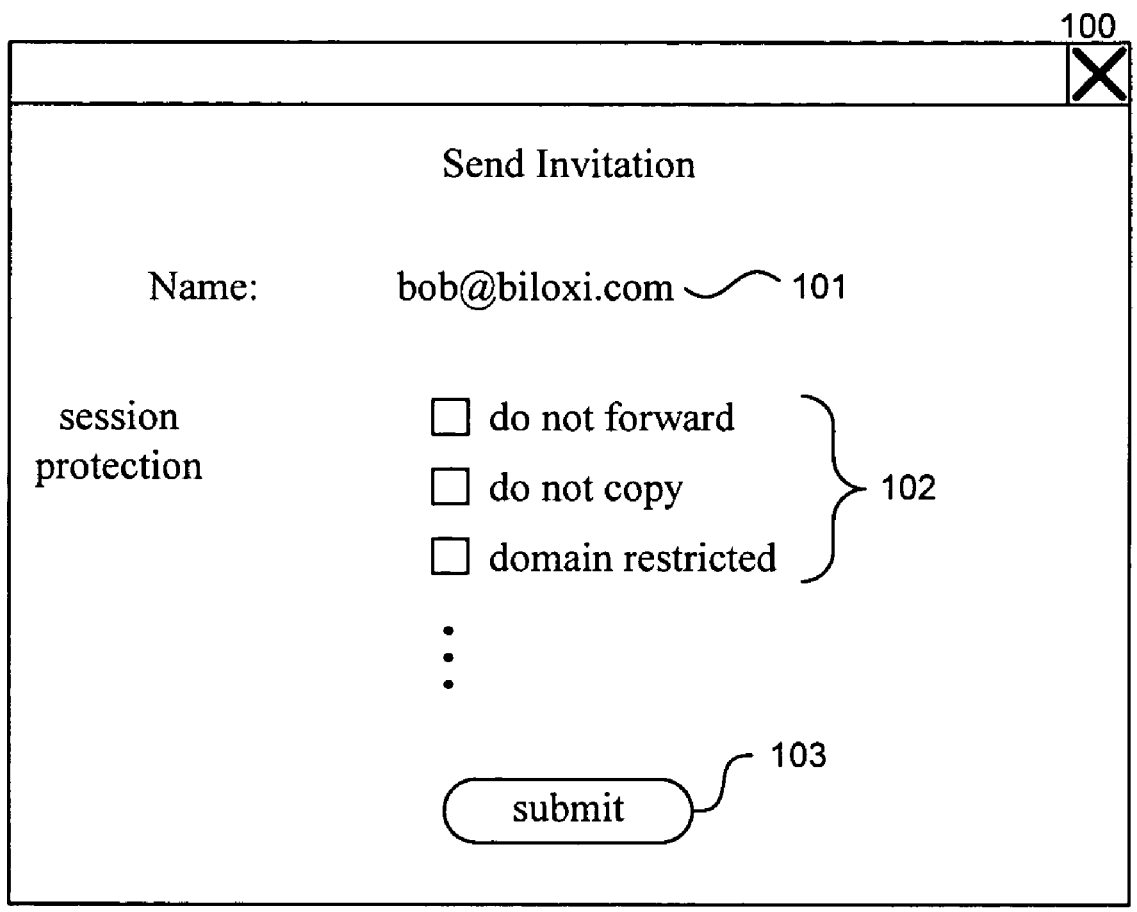
FIG. 1 is a display page that illustrates a user interface provided by an inviter client component through which an inviter can invite an invitee to participate in a session in one embodiment.

A method and system for initiating a communications session with a restriction is provided. In one embodiment, the communications system allows a user to place a restriction on a session to be conducted with another user. If the other user does not agree to the restriction or if the other user's system does not support the restriction, then the session will not be conducted. A session is initiated by an "inviter" specifying that a session with a restriction is to be conducted with an "invitee." The communications system then sends an invitation specifying the restriction to the invitee. If the invitee agrees to abide by the restriction on the session, then the invitee sends a response to the inviter. When the inviter receives an indication that the invitee will abide by the restriction on the session, then the inviter and invitee can conduct the session, such as an instant messaging session. A client component of the communications system executing on the invitee's computer system may help enforce the restriction on the session. For example, if the restriction restricts who the invitee can invite to participate in the session (e.g., only users in a certain domain can participate), then the client component may check each invitation sent by the invitee for that session to ensure it is consistent with the restriction. As another example, if the restriction restricts actions that the invitee can perform on a message (e.g., prohibiting copy and paste of a message), then the client component may check each action of the invitee to ensure it is consistent with the restriction. In this way, an inviter can place restrictions on sessions and be somewhat assured that the invitee will abide by the restrictions as long as the client component is trusted to enforce the restrictions.

In one embodiment, a client component of the communications system may initiate a session using the Session Initiation Protocol. When an inviter wishes to initiate a session, the client component executing the inviter's computer system may prompt the inviter for any restrictions to be placed on the session. In addition, the enterprise with which the inviter is associated (e.g., the inviter may be an employee of a company) may want to place certain restrictions on all sessions of its users. The client component creates an invitation that conforms to the Session Initiation Protocol and the Session Description Protocol. The communications system may extend the SDP to include custom attributes specifying restrictions on a session. For example, one attribute may restrict the session to being private in the sense that no one else should be allowed to participate in the session and none of the messages or their content should be made available to anyone else. The client component then generates a SIP invitation with the SDP data indicating restrictions of the inviter and/or the enterprise. The client component forwards the SIP invitation to the invitee. The client component of the invitee upon receiving the invitation may determine whether it can support the requested restrictions defined by the attributes of the SDP data. If it can support the restrictions, then it includes those attributes in the SDP data of its SIP response to the invitation (e.g., a SIP 200 OK message). If it cannot support a restriction or does not recognize an attribute specifying restrictions, then it does not include those attributes in its response. When the client component supports a restriction, it may prompt the invitee to see if the invitee wants to abide by the restrictions on the session. If the invitee does not want to abide by a restriction, then the client component does not add the attribute specifying that restriction to the SDP data of the response. When the inviter's client component receives the response, it checks the attributes of the SDP data to determine whether the invitee will abide by the restriction requirements.

If the invitee will not abide by the restrictions, then the inviter may decide to not start the session, for example, by not sending a SIP acknowledgement.

In one embodiment, a server enforces certain restrictions on a session when messages of the session are routed through the server. When a session is initiated, the invitation to participate in a session is routed through a proxy server, which stores the restrictions on the session. After the session is started, the messages of the session, particularly those sent by the invitee, are routed through the server. Upon receiving a message from an invitee, the server determines whether the message is consistent with the restrictions on the session. If the message is not consistent with the restrictions on the session, the server may discard the message so that the restrictions can be enforced and notify the inviter and/or the invitee that the message was discarded. For example, if a restriction indicates that only users within a certain domain may be invited to participate in the session and the invitee sends an invitation to a user in another domain, then the server would discard the message. A server, however, may be limited to enforcing only certain restrictions. For example, a server may not be able to enforce any prohibition on a copy and paste of the content of the messages, but may be able to enforce a prohibition on forwarding a message.

In one embodiment, the invitee's client component may provide credentials in the response to the invitation indicating that the invitee's client component can be trusted to enforce the restrictions on the session. The inviter's client component upon receiving the response can then decide whether to proceed with the session based on the credentials. If credentials are not used, then a malicious client component may agree to abide by a restriction on a session, but fail to abide by it. In such a case, the inviter client component may be able to rely on a server to enforce some restrictions by insisting that all messages of the session be routed through the server.

FIG. 1 is a display page that illustrates a user interface provided by an inviter client component through which an inviter can invite an invitee to participate in a session in one embodiment. The display page 100 includes an invitee name input field 101, restriction checkboxes 102, and a submit button 103. The inviter enters the name of the invitee in the invitee name input field and checks the appropriate checkboxes for the desired restrictions. The inviter then selects a submit button to send the invitation to the invitee.

Figure 2:
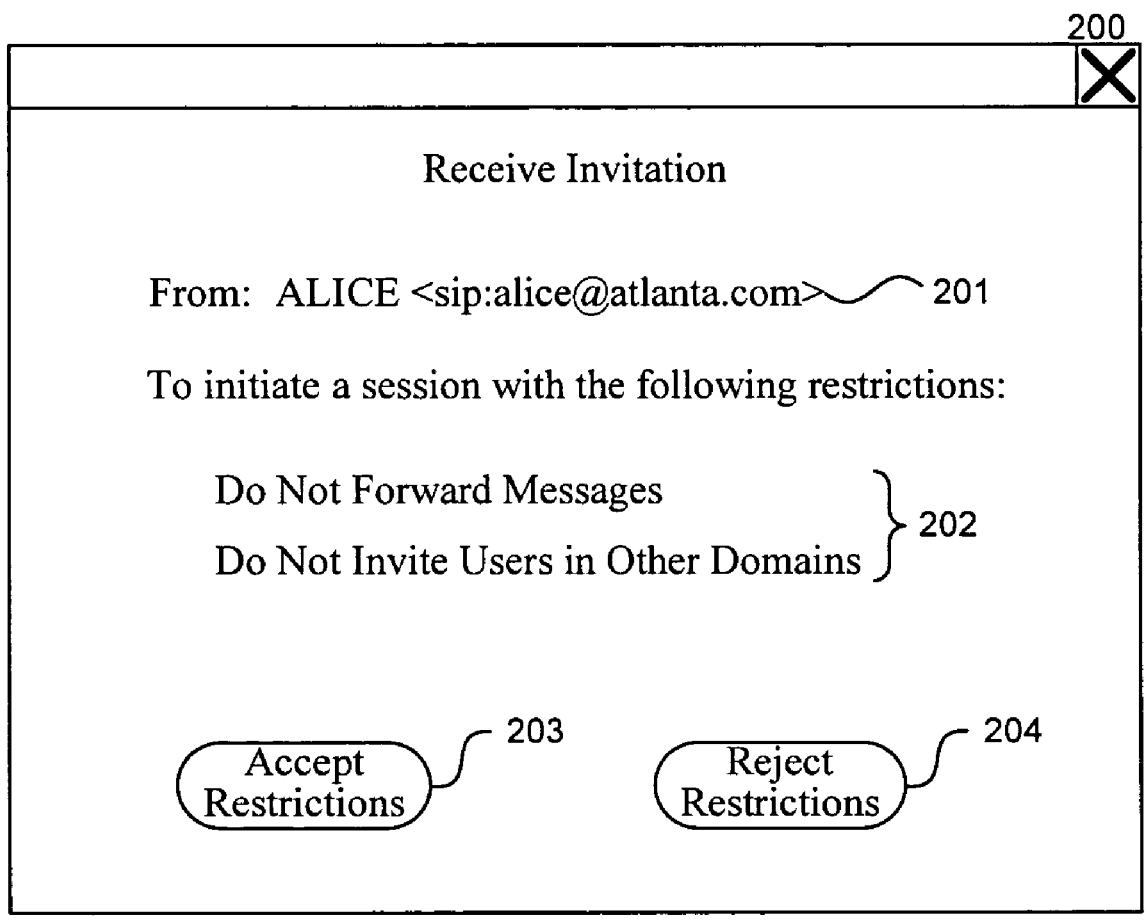
FIG. 2 is a display page that illustrates a user interface provided by an invitee client component through which an invitee can agree to abide by the restrictions of a session in one embodiment.

FIG. 2 is a display page that illustrates a user interface provided by an invitee client component through which an invitee can agree to abide by the restrictions of a session in one embodiment. The display page 200 includes an inviter name field 201, restrictions on the session area 202, an accept restrictions button 203, and a reject restrictions button 204. The inviter name field contains the name of the inviter. The restrictions on the session area lists the various restrictions on the session in which the inviter has invited the invitee to participate. In this example, the restrictions on the session are that the messages are not to be forwarded and users in other domains are not to be invited to participate in the session. If the invitee agrees to abide by the restrictions on the session, then the invitee selects the accept restrictions button. Otherwise, the invitee selects the reject restrictions button. The user interface may allow the invitee to selectively accept or reject the restrictions. After the invitee agrees to abide by the restrictions, the invitee client component sends the response indicating the restrictions that the invitee client component supports and that the invitee agrees to abide by.

Figure 3:
FIG. 3 is a display page that illustrates a user interface of an inviter client component that indicates the restrictions on the session have been accepted in one embodiment.

FIG. 3 is a display page that illustrates a user interface of an inviter client component that indicates the restrictions on the session have been accepted in one embodiment. The display page 300 indicates that the invitee has accepted the invitation sent by the inviter. The invitee client component then sends an acknowledgement message to the invitee to start the session.

Figure 4:
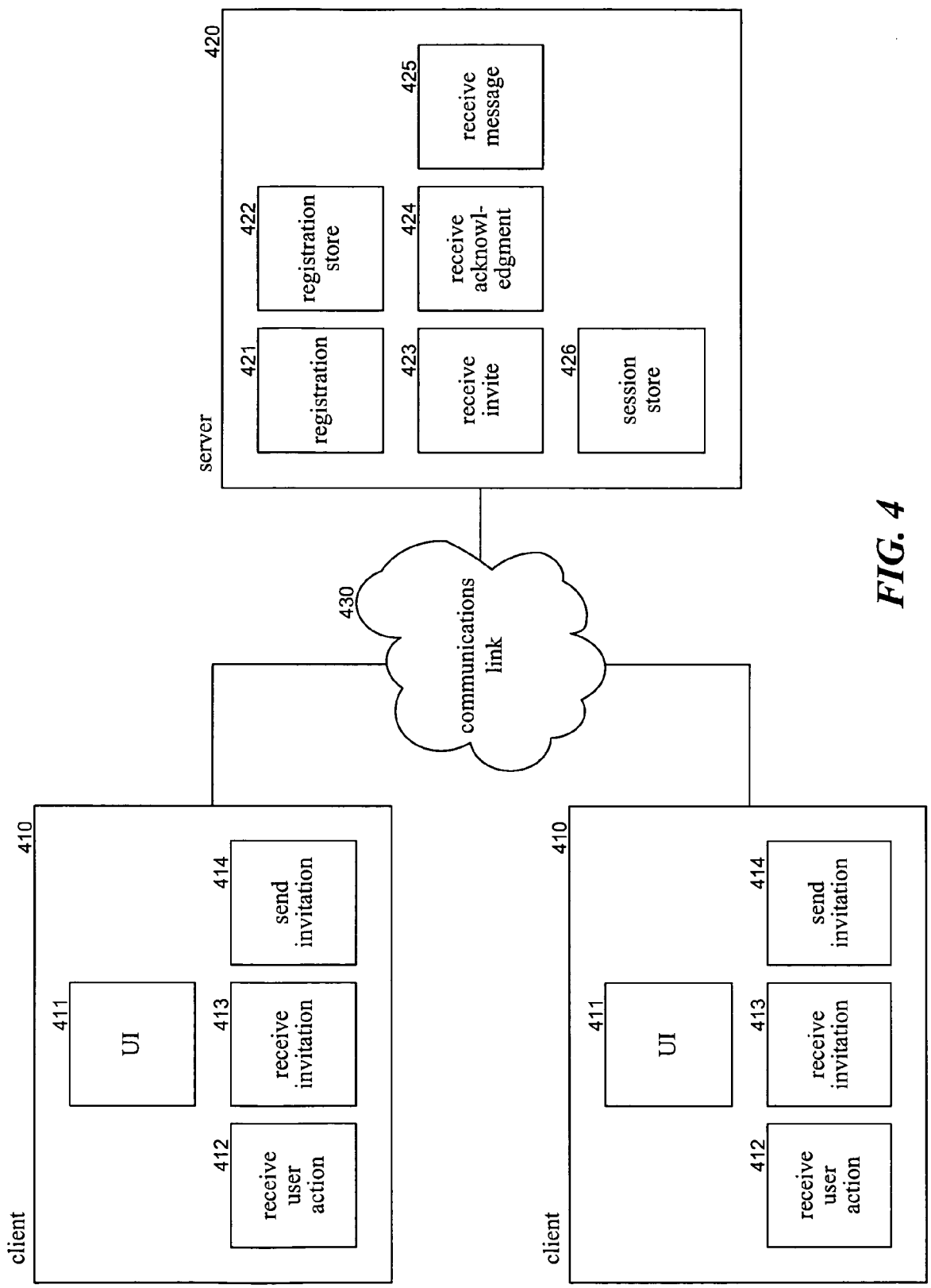
FIG. 4 is a block diagram that illustrates components of the communications system in one embodiment.

FIG. 4 is a block diagram that illustrates components of the communications system in one embodiment. The communications system includes inviter and invitee client components and may include server components when the server is used to enforce restrictions. Client computer systems 410 and a server computer system 420 are connected via a communications link 430, such as the Internet. The client computer systems include a user interface component 411, a receive invitee action component 412, a receive invitation component 413, and a send invitation component 414. The user interface component provides the user interface of FIGS. 1-3. The send invitation component is invoked when an inviter wants to send an invitation. The component prompts the user for the restrictions on the session and then sends the invitation to the invitee indicating the restrictions on the session. The receive invitation component is invoked when an invitee receives an invitation. The component prompts the invitee to determine whether the invitee agrees to abide by the restrictions on the session that the client component supports. If so, then the component sends a response to the inviter indicating that the invitee will abide by the restrictions on the session. The receive invitee action component is invoked whenever the invitee performs an action related to the session. The actions may include an attempt to invite another user to participate in the session, an attempt to forward a message of the session, or an attempt to copy and paste contents of a message. The component determines whether the action is consistent with the restrictions on the session. If not, the component blocks the action. The server computer system includes a registration component 421, a registration store 422, a receive invitation component 423, a receive acknowledgement component 424, a receive message component 425, and a session store 426. The registration component and registration store may be conventional SIP components for registering users who are available to participate in sessions. The registration component may perform registration as defined by SIP. The receive invitation component is invoked when the server receives an invitation from an inviter that is sent to an invitee. The server computer system may be functioning as a SIP proxy server. The receive invitation component may store an indication of the restrictions on the session. The receive acknowledgment component is invoked when the server receives a response from the inviter to the invitee that the inviter acknowledges that the session can be started. The server computer system may also include a component to process the response sent by the invitee to the inviter and record the restrictions that the invitee has agreed to abide by. The receive message component is invoked when a message of the session is received. The receive message component determines whether messages from the invitee are consistent with the restrictions on the session and, if not, discards the messages. The session store stores the restrictions on a session so that they can be enforced.

The computing device on which the communications system is implemented may include a central processing unit, memory, input devices (e.g., keyboard and pointing devices), output devices (e.g., display devices), and storage devices (e.g., disk drives). The memory and storage devices are computer-readable media that may contain instructions that implement the communications system.

Embodiments of the communications system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

Figure 5:
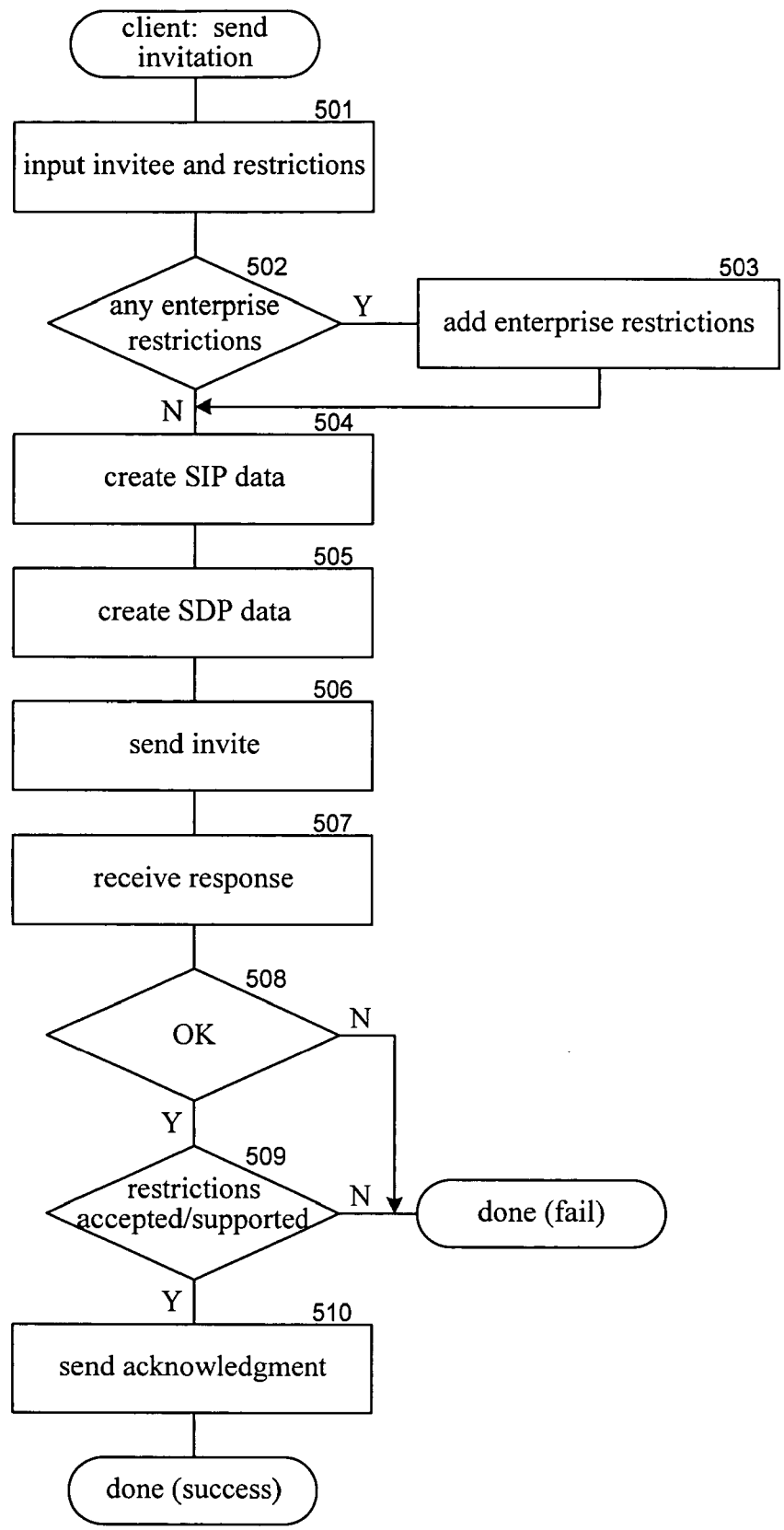
FIG. 5 is a flow diagram that illustrates the processing of the send invitation component of an inviter client component in one embodiment.

FIG. 5 is a flow diagram that illustrates the processing of the send invitation component of an inviter client component in one embodiment. The component is invoked when an inviter wants to send an invitation. The component prompts the inviter for restrictions on the session and may apply enterprise-wide restrictions. The component then sends the invitation to the invitee. When the component receives an indication that the invitee has agreed to abide by the restrictions on the session, then the inviter sends an acknowledgment to the invitee and indicates that the session can start. In block 501, the component inputs the name of the invitee and restrictions to be placed on the session. In decision block 502, if there are any enterprise-wide restrictions to be placed on sessions, then the component continues at block 503, else the component continues at block 504. In block 503, the component adds the enterprise restrictions. In block 504, the component creates the SIP data that identifies the inviter and invitee. In block 505, the component creates the SDP data that include attributes for the restrictions to be placed on the session. In block 506, the component sends the invitation to the invitee. In block 507, the component receives a response from the invitee. In decision block 508, if the response is an OK response, then the component continues at block 509, else the component completes indicating that the initiation of the session has failed. In decision block 509, if the response indicates that the invitee will abide by the restrictions on the session, then the component continues at block 510, else the component completes indicating that the initiation of the session has failed. In block 510, the component sends an acknowledgment to the invitee and then completes indicating that the initiation of the session has succeeded.

Figure 6:
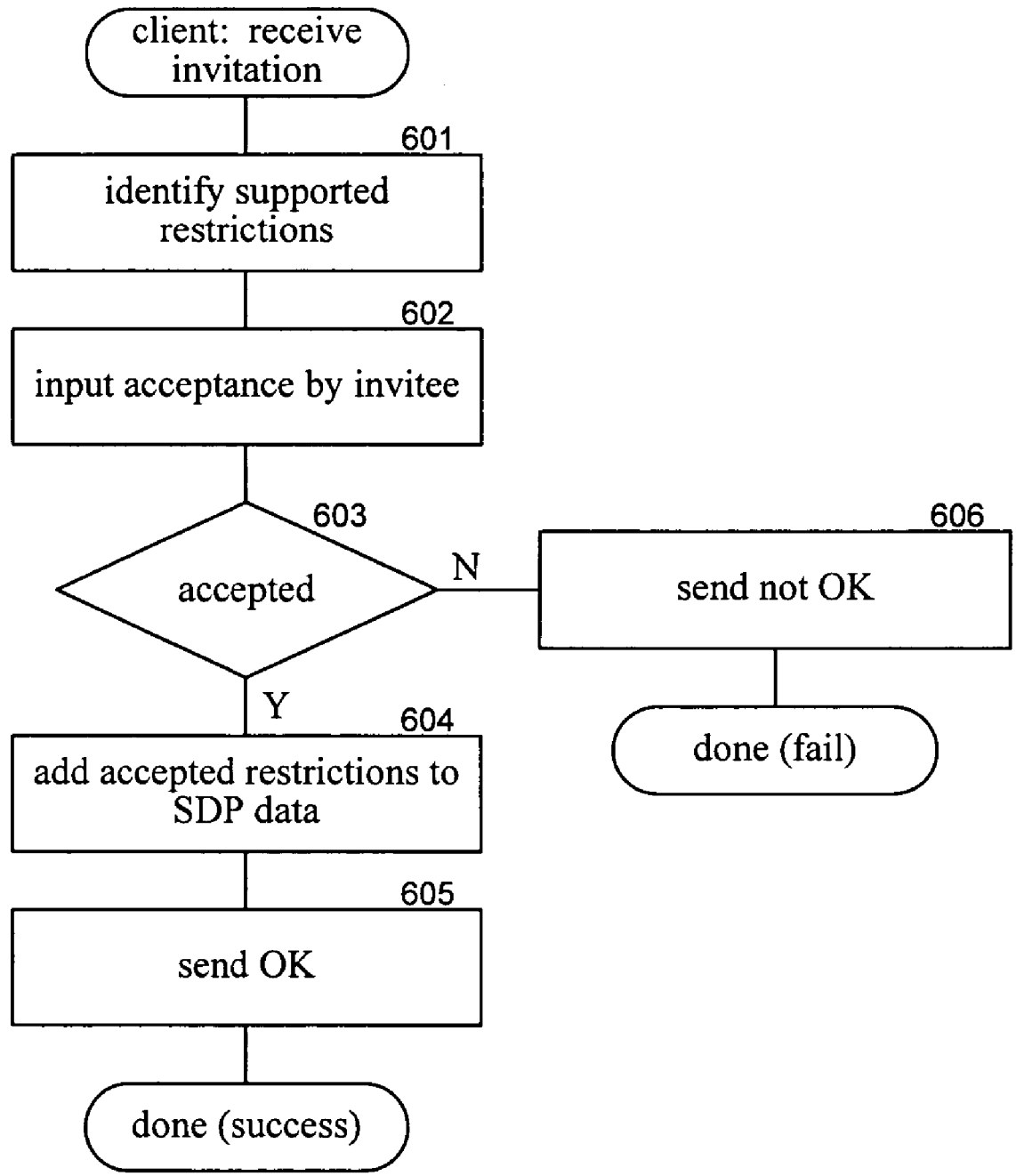
FIG. 6 is a flow diagram that illustrates processing of the receive invitation component of an invitee client component in one embodiment.

FIG. 6 is a flow diagram that illustrates processing of the receive invitation component of an invitee client component in one embodiment. The component receives an invitation and determines whether it can support the restrictions on the session. The component then prompts the invitee to determine whether the invitee will abide by the restrictions that the client component supports. The component then sends an OK response to the inviter indicating the restrictions that it supports and agrees to abide by. In block 601, the component identifies the restrictions that the client component supports and will abide by. In block 602, the component prompts the invitee to indicate whether the invitee will abide by the restrictions on the session that the client component supports. In decision block 603, if the invitee agrees to abide by the restrictions on the session, then the component continues at block 604, else the component continues at block 606. In block 604, the component adds the accepted restrictions to the SDP data of the SIP response to be sent to the inviter. In block 605, the component sends an OK response to the inviter indicating the restrictions that the invitee will abide by and then completes indicating success. In block 606, the component sends a not OK response to the inviter and then completes indicating that initiation of the session has failed.

Figure 7:
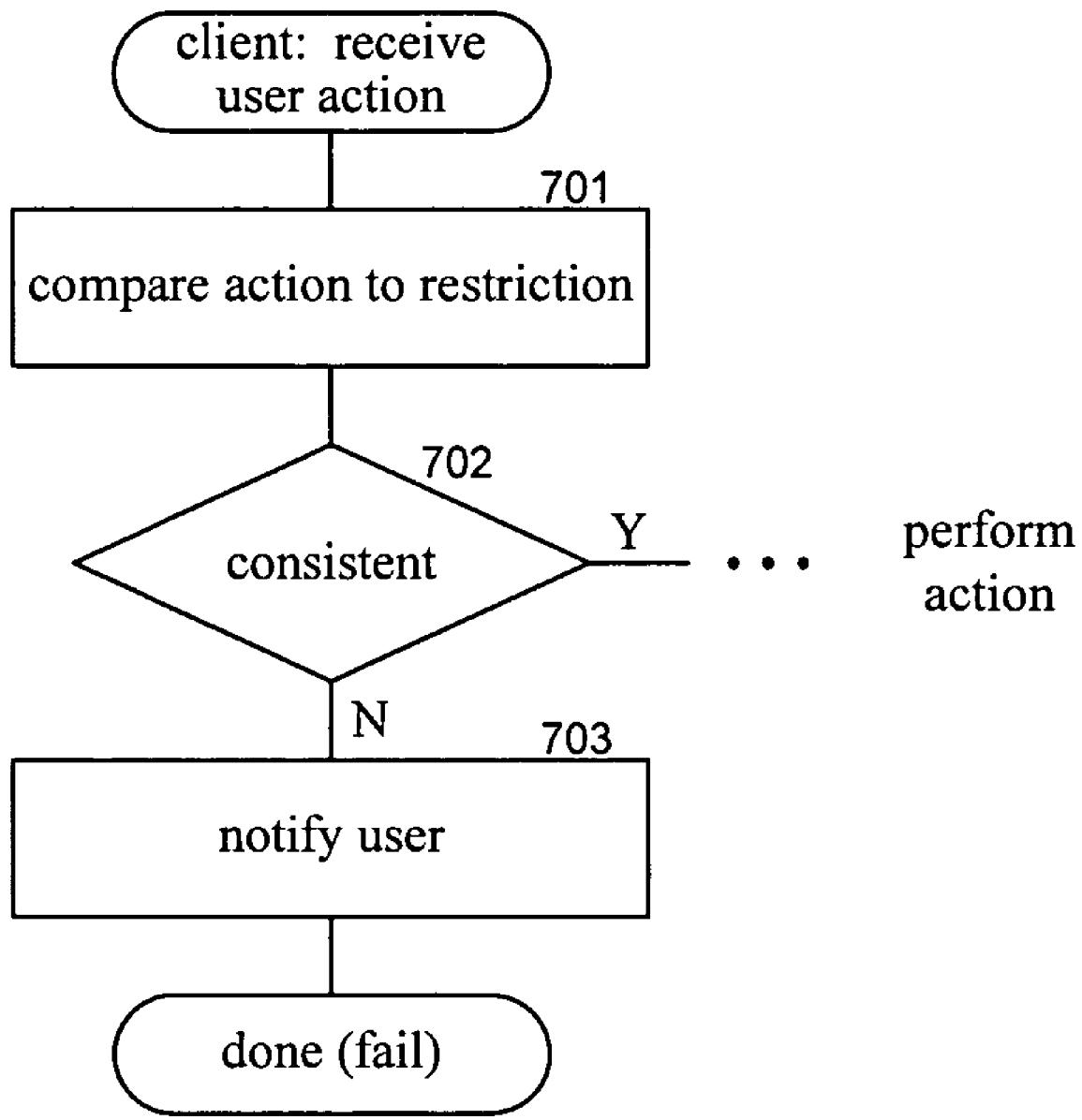
FIG. 7 is a flow diagram that illustrates the processing of the receive invitee action component of an invitee client component in one embodiment.

FIG. 7 is a flow diagram that illustrates the processing of the receive invitee action component of an invitee client component in one embodiment. The component is invoked whenever an invitee performs an action relating to a session with a restriction. The component determines whether the action is consistent with the restrictions on the session. If not, the component blocks the action. In block 701, the component compares the action to the restrictions on the session. In decision block 702, if the action is consistent with restrictions on the session, then the component continues to perform the action, else the component continues at block 703. In block 703, the component notifies the invitee that the action is inconsistent with restrictions on the session and may also notify the inviter. The component then completes indicating that the action has failed.

Figure 8:
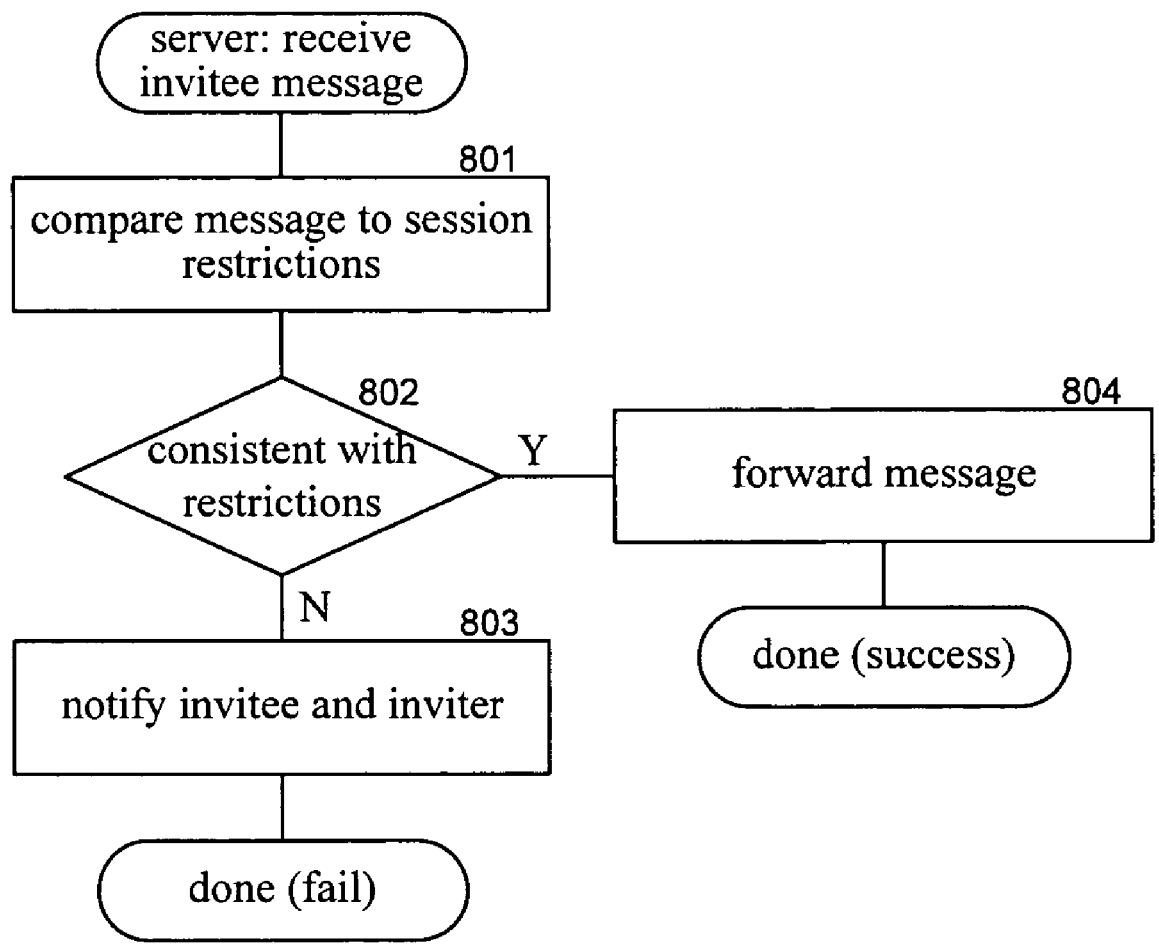
FIG. 8 is a flow diagram that illustrates the processing of the receive message component of a server component in one embodiment.

FIG. 8 is a flow diagram that illustrates the processing of the receive message component of a server component in one embodiment. The component is invoked whenever the server receives a message from the invitee of the session. The component determines whether the message is consistent with restrictions on the session. In block 801, the component compares the message to the restrictions on the session. In decision block 802, if the message is consistent with the restrictions on the session, then the component continues at block 804, else the component continues at block 803. In block 803, the component notifies the invitee and/or the inviter that the message is inconsistent with the restrictions on the session and then completes indicating that the message will not be forwarded. In block 804, the component forwards the message and then completes indicating that the message has been forwarded.

Figure 9:
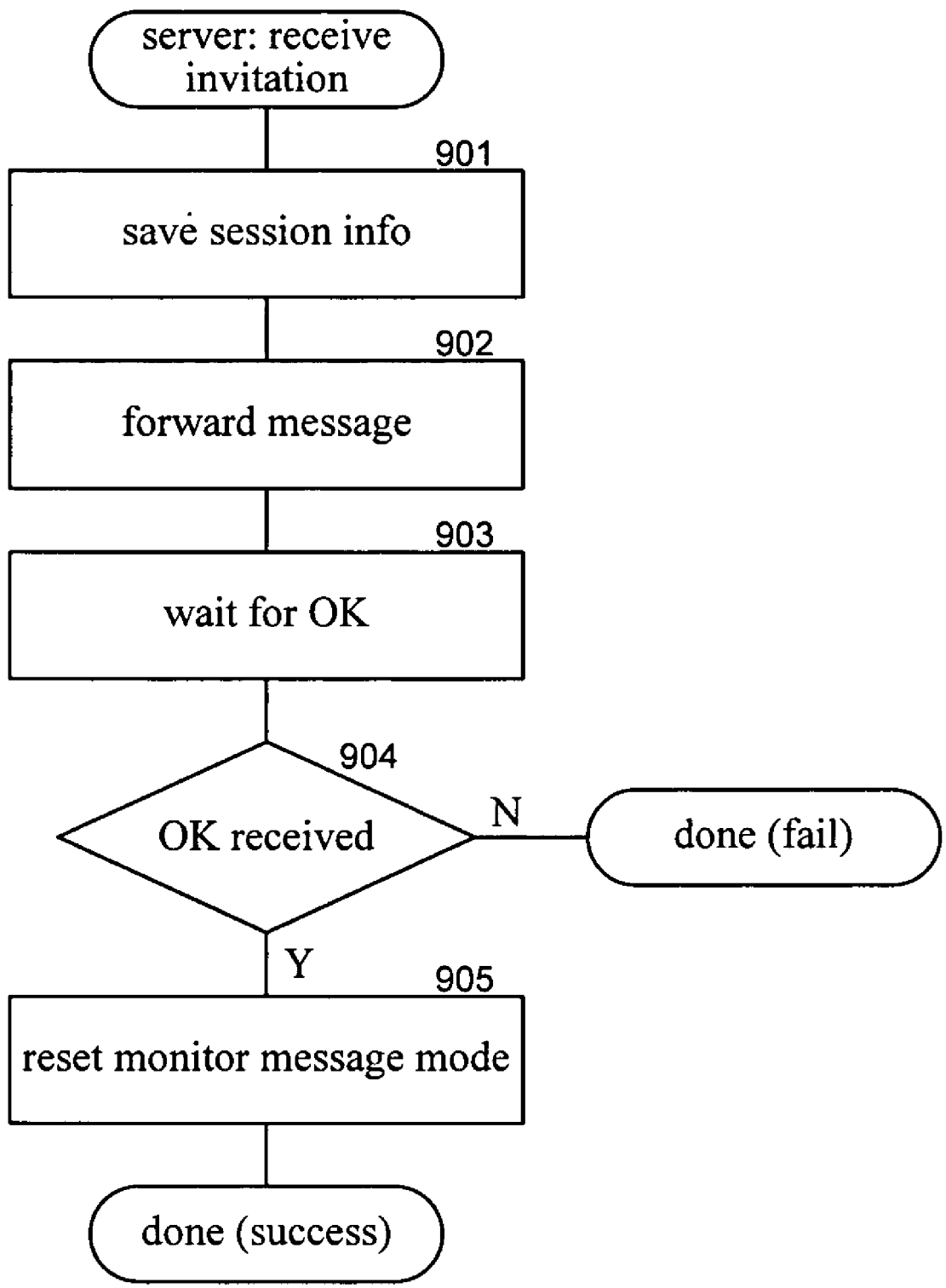
FIG. 9 is a flow diagram that illustrates the processing of the receive invitation component of a server component in one embodiment.

FIG. 9 is a flow diagram that illustrates the processing of the receive invitation component of a server component in one embodiment. The component is invoked when the server receives an invitation from an inviter. The component stores the restrictions on the session so that the server can later enforce the restrictions on the session. In block 901, the component saves session information including the session identification, identification of the invitee and inviter, and restrictions on the session. In block 902, the component forwards the invitation. In block 903, the component waits to receive the OK response from the invitee. In decision block 904, if the OK response was received and the response indicates that the invitee will abide by the restrictions on the session, then the component continues at block 905, else the component indicates that the initiation of the session has failed. In block 905, the component prepares to monitor the messages of the session to enforce the restrictions on the session. The component then completes indicating success. The component may also wait for acknowledgment to be received from the inviter.

From the foregoing, it will be appreciated that specific embodiments of the communications system have been described herein for purposes of illustration, but that various modifications may be made without deviating from the spirit and scope of the invention. One skilled in the art will appreciate that an inviter may put any type of restriction on a session such as the number or length of messages, timing of messages, domains or names of participants, and so on. Also, during a session an inviter may send a re-invitation to the invitee that includes an indication to remove or add one or more restrictions. An inviter may place different restrictions on different invitees. An invitee who invites another to participate in the session may place different restrictions on the participation of the other. However, the communications system may ensure that the restrictions are at least as restrictive as those placed on the invitee by the original inviter. One skilled in the art will appreciate that the communications system can be used with protocols for initiating a session other than SIP. The communications system may also be used to see whether an invitee will agree to restrictions on a session even though the client or server component may not be able to enforce the restrictions. One skilled in the art will appreciate that the restrictions of an enterprise may not be enterprise-wide, but rather can be customized to different users or groups of the enterprise. Accordingly, the invention is not limited except as by the appended claims.

I claim:

1. A method in a computer system for initiating a session with a restriction, the method comprising:

receiving from an inviter an indication of a restriction on the session, the restriction restricting actions of an invitee to prevent unwanted users from viewing content of messages of the session;

sending from the inviter to the invitee an SIP invite message inviting the invitee to participate with the inviter in the session with the restriction, the SIP invite message including an SDP attribute specifying the restriction on the session;

receiving from the invitee a SIP response message indicating that the invitee will participate in the session and indicating whether the invitee will abide by the restriction on the session such that when the invitee agrees to abide by the restriction, the SIP response message includes the SDP attribute included in the SIP invite message, and when the invitee does not agree to abide by the restriction, the SIP response message does not include the SDP attribute; and when the SIP response message indicates that the invitee will participate in the session:

determining whether the SIP response message includes the SDP attribute;

when it is determined that the SIP response message includes the SDP attribute and thus indicating that the invitee will abide by the restriction on the session, conducting the session with the invitee such that the invitee is prevented from performing an action that would allow unwanted users to view content of messages of the session; and when it is determined that the SIP response message does not include the SDP attribute and thus indicating that the invitee will not abide by the restriction, not conducting the session with the invitee.

2. The method of claim 1 wherein the receiving from the invitee of the indication includes receiving an OK message of the Session Initiation Protocol with the attribute.

3. The method of claim 1 wherein the session is an instant messaging session.

4. The method of claim 1 wherein the restriction also restricts who the invitee can invite to participate in the session.

5. The method of claim 1 wherein the restriction also restricts actions that the invitee can perform on messages of the session, the restricted actions including copying of the messages of the session.

6. The method of claim 1 wherein the indication of the restriction is received based on a policy of an enterprise with which the inviter is associated.

7. A computer-readable medium storing instructions for controlling a computer system to conduct a session with a restriction, by a method comprising:

receiving by an invitee an invitation from an inviter to participate in the session with the restriction, the restriction restricting who the invitee can invite to participate in the session, the invitation being a SIP invite message including an SDP attribute specifying the restriction on the session;

determining whether the invitee will abide by the restriction on the session;

when the invitee will abide by the restriction on the session, sending from the invitee to the inviter an indication that the invitee will participate in the session and will abide by the restriction on the session, the sent indication being a SIP response message that includes the SDP attribute included in the SIP invite message to indicate that the invitee agrees to abide by the restriction; and conducting with the inviter the session with the restriction, wherein conducting the session with the restriction includes disallowing the invitee to invite a first user to the session in accordance with the restriction, and allowing the invitee to invite a second user to the session in accordance with the restriction; and when the invitee will not abide by the restriction on the session, sending from the invitee to the inviter an indication that the invitee will participate in the session but will not abide by the restriction on the session, the sent indication being a SIP response message that does not include the SDP attribute included in the SIP invite message to indicate that the invitee does not agree to abide by the restriction wherein the inviter, after receiving the sent indication, determines not to conduct the session with the invitee.

8. The computer-readable medium of claim 7 wherein the conducting includes preventing the invitee from taking any action that is inconsistent with the restriction on the session.

9. The computer-readable medium of claim 7 wherein the determining includes a client component determining whether it can enforce the restriction on the session.

10. The computer-readable medium of claim 7 wherein the session is initiated using the Session Initiation Protocol.

11. The computer-readable medium of claim 7 wherein the session is an instant messaging session.

12. A computer-readable medium storing instructions for controlling a server to enforce a restriction on a session, by a method comprising:

receiving from an inviter an invitation to an invitee to participate in the session with the restriction, the restriction restricting actions that the invitee can take that would make a message of the session available to others, the invitation conforming to the Session Initiation Protocol and the restriction being specified as an attribute conforming to the Session Description Protocol;

after receiving the invitation recording the restriction on the session as indicated by the invitation;

sending the invitation to the invitee; and receiving from the invitee a response to the sent invitation, the response indicating that the invitee accents the invitation and whether the invitee agrees to abide by the restriction as indicated by an attribute conforming to the Session Description Protocol; and when the response indicates that the invitee agrees to abide the restriction and after the session has been established between the inviter and the invitee, receiving from the invitee a message of the session;

determining whether the message is consistent with the recorded restriction on the session;

when it is determined that the message is not consistent with the restriction on the session, discarding the message; and when it is determined that the message is consistent with the restriction on the session, forwarding the message to the inviter.

13. The computer-readable medium of claim 12 wherein the discarding includes notifying the invitee that the invitee sent a message that was not consistent with the restriction on the session.

14. The computer-readable medium of claim 12 wherein the sever is a proxy server.

* * * * *